United States Patent [19]
Winn, Jr.

[11] 3,741,533
[45] June 26, 1973

[54] MIXING APPARATUS

[75] Inventor: Fred M. Winn, Jr., Tulsa, Okla.

[73] Assignee: The Dow Chemical Company, Midland, Mich.

[22] Filed: Oct. 14, 1971

[21] Appl. No.: 189,247

[52] U.S. Cl. .................................. 259/4, 259/168
[51] Int. Cl. ......................... B01f 5/12, B01f 15/02
[58] Field of Search ................ 259/4, 153, 18, 161, 259/162, 164, 165, 168, 146, 148, 151, 147

[56] References Cited
UNITED STATES PATENTS

| | | | |
|---|---|---|---|
| 1,680,678 | 8/1928 | Halliburton | 259/147 |
| 2,528,514 | 11/1950 | Harvey | 259/4 |
| 3,201,093 | 8/1965 | Smith | 259/4 |
| 3,256,181 | 6/1966 | Zingg | 259/161 |
| 3,484,082 | 12/1969 | Dupeuble | 259/153 |

Primary Examiner—Robert W. Jenkins
Attorney—William M. Yates and Earl D. Ayers

[57] ABSTRACT

This invention relates to apparatus for continuously mixing dry bulk material with a liquid to form a slurry. The apparatus provides for the dry material to be added to the liquid for initial wetting of the dry material. The wetted material is then directed against a baffle from which it is deflected into a reservoir. The slurry thus formed is circulated by a suitable pump from the reservoir through a system of piping back into a shroud enveloping the initial wetting device, and is discharged with a rotary motion back into the reservoir. Centrifugal force resulting from rotary motion of the slurry prevents material from splashing back into the dry material delivery tube.

In the initial wetting stage of the system, the liquid is formed into a hollow cylindrical pattern within and more or less concentric with the circulating slurry which has also been shaped into a hollow cylindrical pattern, revolving helically as it exits into the reservoir. The dry material is introduced into the hollow center of the liquid cylinder, and therefore must pass through the liquid before exiting into the reservoir.

6 Claims, 4 Drawing Figures

PATENTED JUN 26 1973 3,741,533
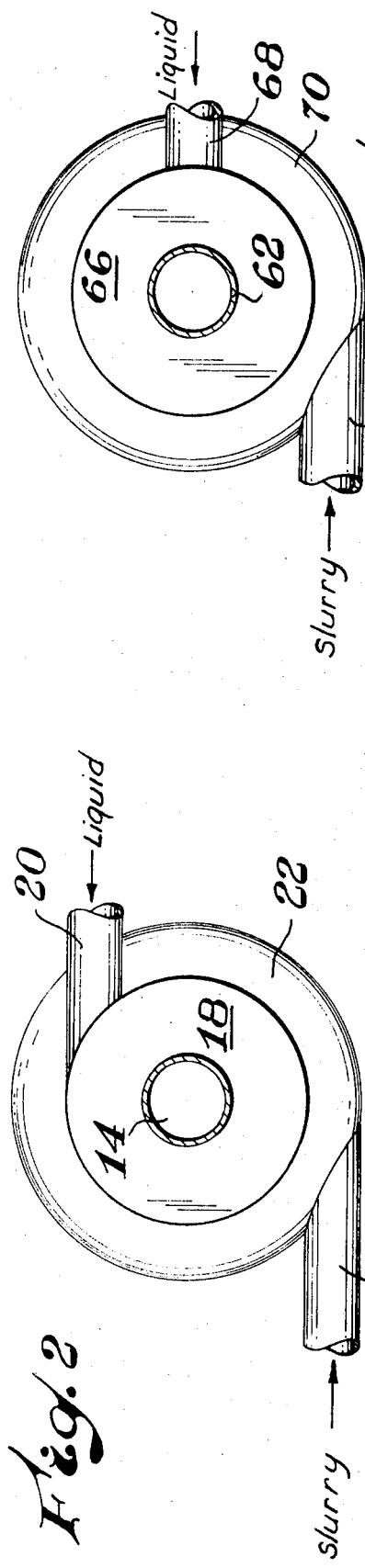
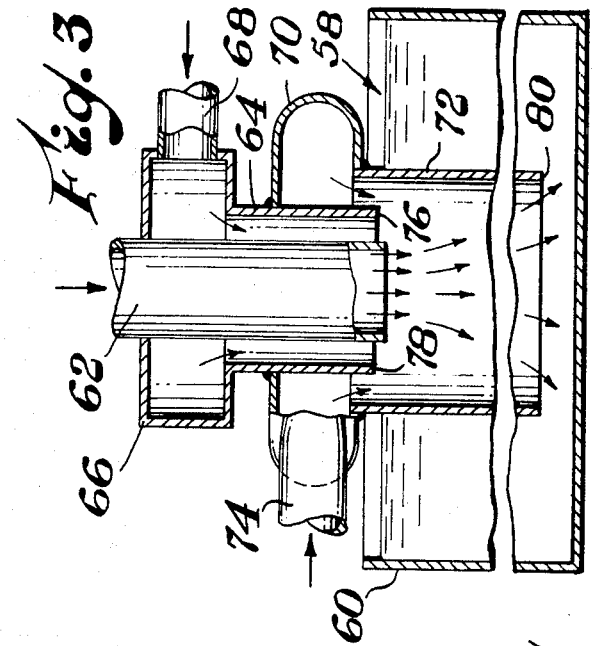
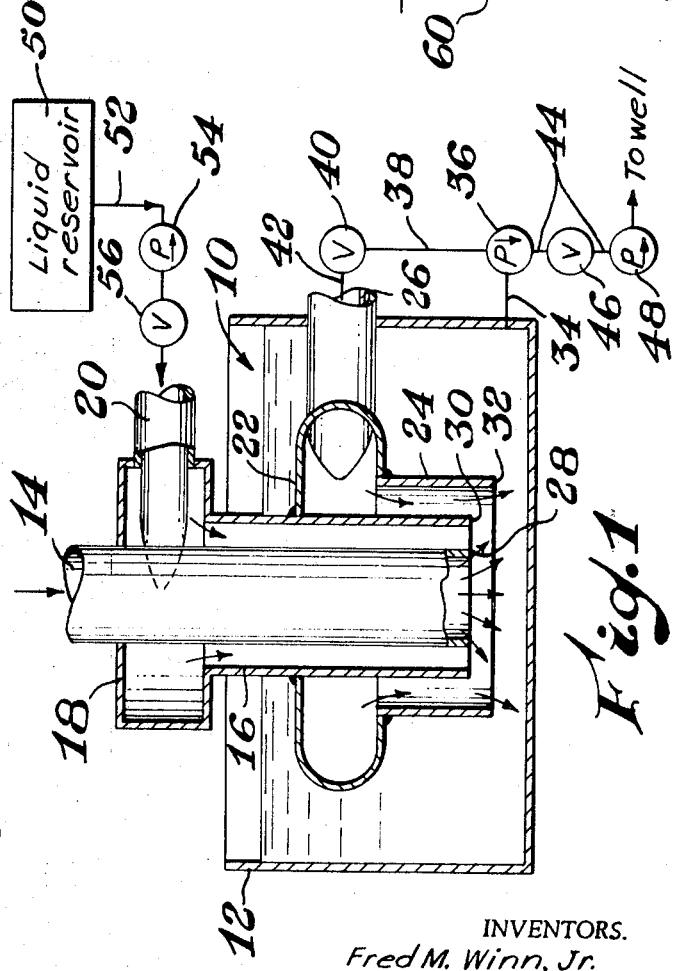
INVENTORS.
Fred M. Winn, Jr.
BY Omer E. Carrington
Earl D. Ayers
AGENT

MIXING APPARATUS

BACKGROUND OF THE INVENTION

This invention relates to apparatus for mixing particulate solid material with a liquid containing medium, and particularly to cement mixing apparatus.

In oil and gas well (or other earth well) cementing service, it is necessary to provide cement mixers which will rapidly prepare large quantities of neat cement at a predetermined density. The neat cement is then pumped into the well being treated.

Paddle type mixers and so-called jet mixers are commonly used in preparing neat cement for use in well cementing service. Paddle type mixers do an excellent job of mixing but require a mixing tank having a relatively large volume. Since the tank and mixer must be transported from well to well, the bulk and weight make this type of mixing equipment somewhat expensive to use as compared to lighter, less bulky equipment. Further, when thick slurries are mixed, the equipment operator must be careful not to permit the paddles to stick. In addition, cleanup of the equipment after use can be a practical problem when this type of mixer is used.

Jet type mixers function well in making ordinary cement slurries, but the adequate mixing of gel cements has proven difficult with a jet type mixer. Also, the jet mixer usually requires the use of one of the treating pumps to drive the jet, decreasing the capacity of the treating truck of actually pump cement into the well.

Recently vortex mixers of the type disclosed and claimed in U. S. Pat. No. 3,201,093 have been used. While such mixtures are adequate for many uses, extremely dense slurries are difficult to make with such devices.

OBJECTS OF THE INVENTION

Accordingly, a principal object of this invention is to provide an improved mixing apparatus.

Another object of this invention is to provide an improved mixing apparatus which requires a relatively small amount of energy to operate it as compared with prior art devices for making dense slurries.

A further object of this invention is to provide a lighter, more compact apparatus for use in making dense slurries.

STATEMENT OF THE INVENTION

In accordance with this invention, there is provided apparatus to continuously mix dry bulk material with a liquid to form a slurry. The apparatus provides for the dry material to be added to the liquid for initial wetting of the dry material. The wetted material is then directed against a baffle (which may be the bottom of the reservoir) from which it is deflected into the reservoir. The slurry thus formed is circulated by a suitable pump from the reservoir through a system of piping back into a shroud enveloping the initial wetting device, and is discharged with a rotary motion back into the reservoir. Centrifugal force resulting from rotary motion of the slurry prevents material from splashing back into the dry material delivery tube.

In the initial wetting stage of the system, the liquid is formed into a hollow cylindrical pattern within and more or less concentric with the circulating slurry which has also been shaped into a hollow cylindrical pattern, revolving helically as it exits into the reservoir. The dry material is introduced into the hollow center of the liquid cylinder, and therefore must pass through the liquid before exiting into the reservoir.

The "liquid" may be introduced tangentially or radially. In any event, the liquid should exit at the lower end of the annular jacket in such fashion as to not splash back into the dry material conduit where caking might occur.

BRIEF DESCRIPTION OF THE DRAWING

The invention, as well as additional objects and advantages thereof, will best be understood when the following detailed description is read in connection with the accompanying drawing, in which:

FIG. 1 is a simplified diagrammatical view, partly in section, of mixing apparatus in accordance with this invention;

FIG. 2 is a plan view of FIG. 1;

FIG. 3 is a simplified diagrammatical view, partly in section, of an alternative embodiment of this invention, and FIG. 4 is a plan view of FIG. 3.

DETAILED DESCRIPTION OF THE DRAWING

Referring to the drawings, and particularly to FIGS. 1 and 2, there is shown mixing apparatus, indicated generally by the numeral 10, a slurry reservoir 12 into which the apparatus 10 extends, and associated piping and pumping means.

The apparatus 10 includes a central dry mix inlet tube 14, usually vertically disposed, surrounded along its lower part by a concentric tubular part 16 (middle tubular part) which communicates at its upper end with a cylindrically shaped hollow member 18 whose top is sealed around the tube 14 and whose bottom is sealed at its inner edges to the upper end of the tubular part 16. A liquid inlet tube is coupled tangentially through the side wall of the hollow member 18.

A third or outer tubular element 24 concentrically surrounds and is spaced from the lower part of the tubular part 16.

Another member 22, of substantially larger diameter than the diameter of the tubular element 24 and having a top, bottom, and curved side walls surrounds the tubular part 16 below the hollow member 18. The top of the member 22 is sealed to the wall of the tubular part 16 while the bottom thereof is sealed to the top of the tubular element 24.

A slurry inlet line 26 communicates tangentially with the interior of the member 22.

A liquid reservoir 50 is coupled through line 52, pump 54 and valve 56 to the liquid inlet tube 20.

Slurry from the reservoir or tank 12 is recirculated by means of line 34, pump 36, line 38, valve 40 and line 42 to the slurry inlet 22.

In operation, liquid, water plus additives, for example, is pumped from the reservoir 50 to the hollow member 18 through the inlet 20, swirling around the cylindrical chamber walls and exiting downwardly along the walls of the tubular part 16. Dry cement or other particulated material enters the apparatus from above via the inlet tube 14. The inlet tube 14 may be coupled to a metering hopper (not shown) into which cement may be loaded or to a pneumatically operated cement distribution line (not shown).

Usually some liquid is introduced into the reservoir 12 via the tube 16 before the cement and/or other particulated material is added. The liquid enters the chamber defined by the hollow member 18 at sufficient pressure to produce a swirling vortex therein, the swirling liquid which cannot be contained in the chamber being dispersed downwardly in swirling sheet like form along the inner wall of the tube 16, impinging on the bottom of the reservoir (or upon a baffle plate if the bottom of the reservoir is an excessive distance from the bottom 30 of the tube 16).

The particulated material enters the apparatus and passes down the tube 14 to its bottom 28 whereupon it is urged outwardly and downwardly to contact the liquid which is escaping from the end 30 of the tube 16. The violent shearing action as the liquid emerges from the annulus between the tube 16 and the tube 14 hits the baffle plate or bottom of the reservoir results in turbulance which causes intimate mixing of the cement with the water at a rapid rate.

The inventory of the reservoir 12 is then pumped via line 34, pump 36 line 38, valve 40 and line 42 through the slurry inlet line 26 to the vortex forming chamber defined by the member 22 where it is forced downwardly through the annulus between the tube 16 and the tubular element 24.

The particulated materials and liquid, mixed or unmixed, then combines with and is intimately mixed with the already mixed slurry entering through the inlet 26. In order to increase the slurry density the amount of liquid introduced through the inlet 20 is substantially reduced with respect to the amount of particulated material entering the tube 14.

Because of the continuing recirculation of the inventory of the reservoir 12 as the density of the slurry is being increased, a more uniform density is achieved in the material in the reservoir.

After the required slurry density is reached, valve 46 is opened and the dense slurry is pumped to the well or other utilization point with recirculation continuing at a reduced rate. Often a booster pump 48 is used to inject the cement into the well.

The embodiment of the apparatus shown in FIGS. 3 and 4 is in most cases similar to that shown in FIGS. 1 and 2. The reservoir 60, hollow member 66, chamber member 70, slurry inlet tube 74 and tubular element 72 are the same as reservoir 12, hollow member 18, member 22, slurry inlet 26 and tubular element 24, respectively. Inlet tube 62, though similar to tube 14, is substantially shorter than tube 14, its lower end 76 being just below the lower end 78 of tube 64 (which other than for its shorter length corresponds to the tube 30). The lower end of the tube 76 is just below the bottom of the slurry reentry member 70. The liquid inlet 68 is connected to the member 66 radially.

In the operation of the apparatus of FIGS. 3 and 4, the liquid extends down the annulus between the tubular elements 62, 64 in a sheet-like manner adjacent to and within the sheath of recirculated slurry which descends from the slurry recirculation chamber defined by the member 70. The particulated material entering through the tube 62 disperses and contacts the sheet-like liquid and is wet by that liquid before contacting the recirculating slurry and being mixed with it as the materials are deflected in a turbulent manner from the bottom of the reservoir 60 or other baffle plate.

In one test, the mixer, of the type shown in FIGS. 1 and 2, mixed a slurry having a density of 19.5 pounds per gallon at a rate in excess of 2 barrels per minute. The particulated material comprised alamo Class "H" cement, silica sand.

It appears that the mixing of the dry particulated material with a liquid before it is mixed with the recirculated slurry results in improved initial wetting of the particulated material and in better, faster mixing than occurred in prior art type mixers. Further, using separate liquid entry and recirculated slurry entry chambers makes it easier to control the relative amounts introduced to the apparatus than if a common entry chamber was used.

What is claimed is:

1. Slurry mixing apparatus comprising a liquid entry chamber having a top, a bottom, and a generally circular inner peripheral wall, liquid inlet means communicating with said wall, a particulated material inlet tube, said tube being smaller in diameter than the diameter of said liquid entry chamber and extending concentrically through the top and bottom and substantially below the bottom of said liquid entry chamber and sealed to said top, a liquid outlet tube, said liquid outlet tube surrounding and being spaced from said particulated material inlet tube and being sealed to the bottom of said liquid entry chamber, a recirculated slurry entry chamber having a top, a bottom and a generally circular inner peripheral wall, said particulated material inlet tube and liquid outlet tube extending through said recirculated slurry entry chamber, said liquid outlet tube being sealed to the top of said slurry entry chamber, means for introducing slurry through said wall of said slurry entry chamber, a recirculated slurry outlet tube, said recirculated slurry outlet tube surrounding and being spaced from said liquid outlet tube and being sealed to said bottom of said slurry entry chamber, said slurry outlet tube extending at least to the bottom of said liquid outlet tube and said particulated materials inlet tube, baffle means below said slurry outlet tube, a reservoir having walls extending above the bottom of said slurry outlet tube, and means for recirculating slurry from said reservoir to said means for introducing slurry.

2. Apparatus in accordance with claim 1, wherein said liquid inlet means is a tangentially disposed tube.

3. Apparatus in accordance with claim 1, wherein said means for introducing recirculated slurry is disposed generally tangentially with respect to the wall of said slurry entry chamber.

4. Apparatus in accordance with claim 1, wherein said particulated material inlet tube, said liquid outlet tube and said recirculated slurry outlet tube are coaxial with respect to each other.

5. Apparatus in accordance with claim 1, wherein said recirculated slurry outlet tube extends substantially below said liquid outlet tube and said particulated material inlet tube.

6. Apparatus in accordance with claim 1, wherein means are provided for applying liquid under substantial pressure to said liquid inlet means.

* * * * *

UNITED STATES PATENT OFFICE
CERTIFICATE OF CORRECTION

Patent No. 3,741,533          Dated    June 26, 1973

Inventor(s) Fred M. Winn, Jr. and Omer E. Carrington

It is certified that error appears in the above-identified patent and that said Letters Patent are hereby corrected as shown below:

Page 1, after "Inventor:" add the following name

"Omer E. Carrington"

Signed and sealed this 6th day of August 1974.

(SEAL)
Attest:

McCOY M. GIBSON, JR.
Attesting Officer

C. MARSHALL DANN
Commissioner of Patents